(12) United States Patent
Newton et al.

(10) Patent No.: US 11,358,660 B2
(45) Date of Patent: Jun. 14, 2022

(54) AUTONOMOUS VEHICLE HAVING ROTATABLE FIFTH WHEEL

(71) Applicants: Dean Newton, Osawatomie, KS (US);
Chris Booth, Lawrence, KS (US);
Per-Erik Johansson, Lidhult (SE);
Hans Philip Zachau, Gothenburg (SE);
Robert Bourghardt, Gothenburg (SE)

(72) Inventors: Dean Newton, Osawatomie, KS (US);
Chris Booth, Lawrence, KS (US);
Per-Erik Johansson, Lidhult (SE);
Hans Philip Zachau, Gothenburg (SE);
Robert Bourghardt, Gothenburg (SE)

(73) Assignee: Cargotec Patenter AB, Kista (SE)

( * ) Notice: Subject to any disclaimer, the term of this patent is extended or adjusted under 35 U.S.C. 154(b) by 269 days.

(21) Appl. No.: 16/688,424

(22) Filed: Nov. 19, 2019

(65) Prior Publication Data

US 2020/0164935 A1   May 28, 2020

Related U.S. Application Data

(60) Provisional application No. 62/772,485, filed on Nov. 28, 2018.

(51) Int. Cl.
*B62D 53/08* (2006.01)
*B62D 53/12* (2006.01)

(52) U.S. Cl.
CPC ..... *B62D 53/0885* (2013.01); *B62D 53/0814* (2013.01); *B62D 53/0821* (2013.01); *B62D 53/0835* (2013.01); *B62D 53/0842* (2013.01); *B62D 53/12* (2013.01)

(58) Field of Classification Search
CPC ............ B62D 53/0885; B62D 53/0814; B62D 53/0835; B62D 53/12; B62D 53/0821; B62D 53/0842
See application file for complete search history.

(56) References Cited

U.S. PATENT DOCUMENTS

| | | | | |
|---|---|---|---|---|
| 5,284,356 A | * | 2/1994 | Heider | B62D 53/0864 |
| | | | | 280/425.1 |
| 5,297,911 A | * | 3/1994 | Powell | B66F 9/18 |
| | | | | 280/433 |
| 5,330,222 A | * | 7/1994 | Halverson | B60G 9/04 |
| | | | | 280/124.109 |
| 5,873,592 A | | 2/1999 | Daenens | |
| 7,111,862 B1 | * | 9/2006 | Eng | B60G 9/00 |
| | | | | 280/438.1 |
| 7,506,886 B2 | * | 3/2009 | Warnock | B62D 53/0814 |
| | | | | 280/407 |

(Continued)

FOREIGN PATENT DOCUMENTS

| | | |
|---|---|---|
| JP | 2006-192974 | 7/2006 |
| KR | 10-1996-0007073 | 5/1996 |

(Continued)

*Primary Examiner* — Minnah L Seoh
*Assistant Examiner* — Marlon A Arce
(74) *Attorney, Agent, or Firm* — Reinhart Boerner Van Deuren P.C.

(57) ABSTRACT

A terminal tractor includes a fifth wheel coupling which is rotatable relative to a longitudinal axis of the terminal tractor such that an opening in the fifth wheel coupling may be reoriented depending on the terminal tractor's direction of approach to a semi-trailer.

13 Claims, 6 Drawing Sheets

(56) References Cited

U.S. PATENT DOCUMENTS

| | | | |
|---|---|---|---|
| 8,967,939 B2* | 3/2015 | Hammonds | B64F 1/227 |
| | | | 414/429 |
| 2003/0132604 A1* | 7/2003 | Evans | B62D 53/06 |
| | | | 280/438.1 |
| 2004/0230361 A1 | 11/2004 | Oshima et al. | |
| 2004/0238259 A1 | 12/2004 | Itoh | |
| 2006/0037787 A1 | 2/2006 | Hammonds | |
| 2007/0114759 A1 | 5/2007 | Biondi et al. | |
| 2011/0072999 A1 | 3/2011 | Banwart | |
| 2011/0074132 A1 | 3/2011 | Wart | |
| 2011/0266774 A1 | 11/2011 | Gregg | |
| 2012/0059549 A1 | 3/2012 | Noel | |
| 2012/0067653 A1 | 3/2012 | Mallett et al. | |
| 2015/0210326 A1 | 7/2015 | Sponselee | |
| 2019/0233034 A1 | 8/2019 | Viele et al. | |
| 2021/0114422 A1 | 4/2021 | Goodarzi et al. | |

FOREIGN PATENT DOCUMENTS

| | | |
|---|---|---|
| KR | 10-0621638 B1 | 9/2006 |
| KR | 10-2016-0034665 A | 3/2016 |
| KR | 1020160034665 A | 3/2016 |
| KR | 10-2018-0052880 A | 5/2018 |

* cited by examiner

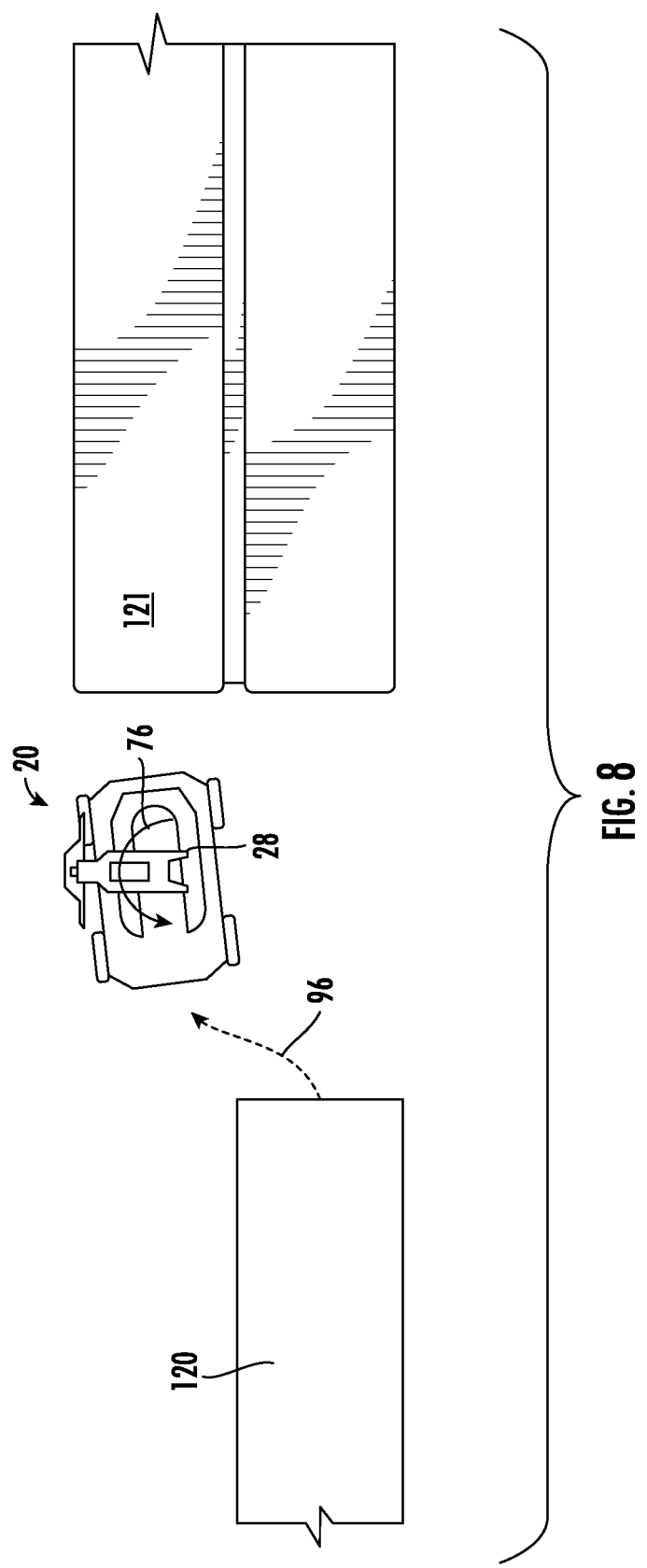

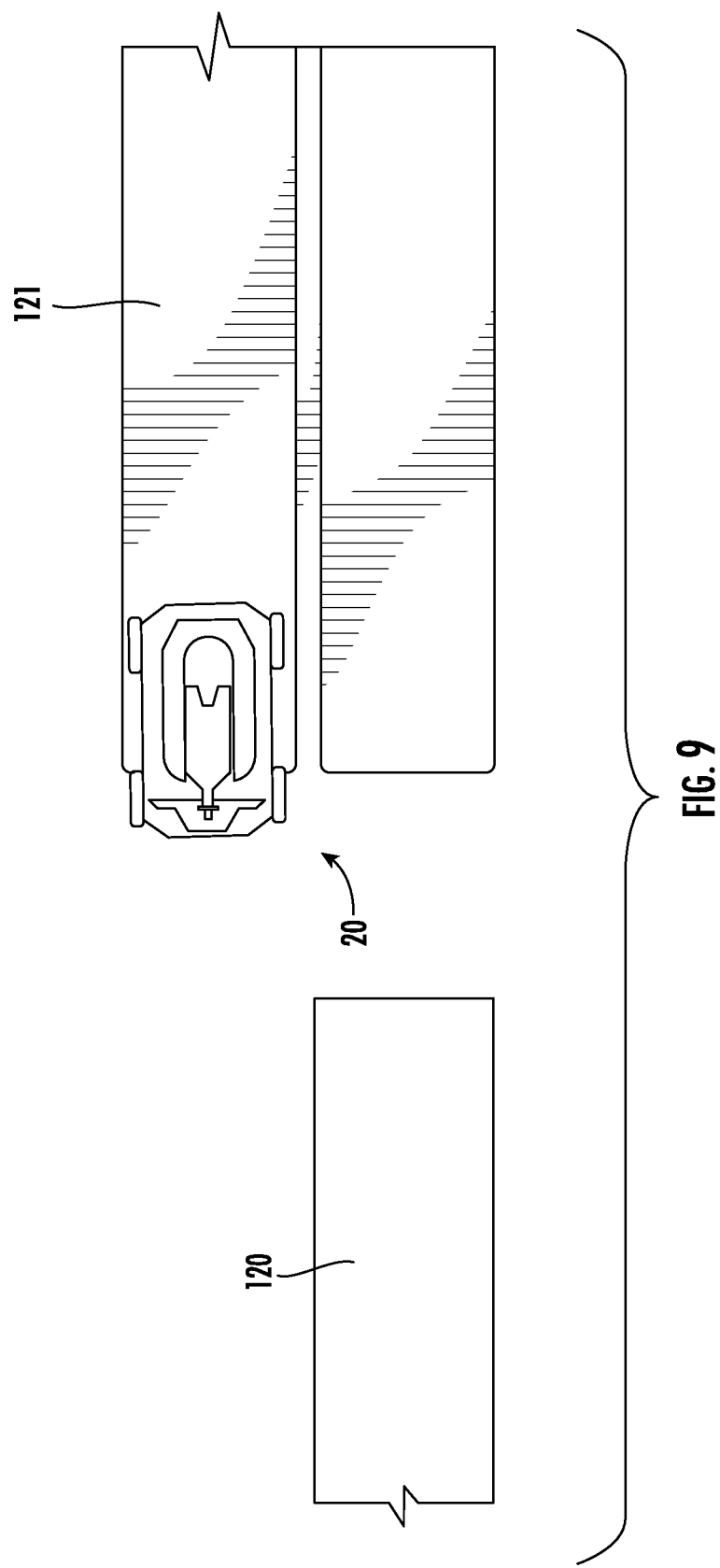

AUTONOMOUS VEHICLE HAVING ROTATABLE FIFTH WHEEL

CROSS-REFERENCE TO RELATED PATENT APPLICATIONS

This patent application claims the benefit of U.S. Provisional Patent Application No. 62/772,485, filed Nov. 28, 2018, the entire teachings and disclosure of which are incorporated herein by reference thereto.

FIELD OF THE INVENTION

This invention relates to ground vehicles, and more particularly to terminal tractor vehicles used for towing semi-trailers.

BACKGROUND OF THE INVENTION

Terminal tractors are semi-tractor vehicles used for moving semi-trailers about a cargo holding area, a warehouse facility, intermodal facility, or other similar locations. Such vehicles provide an efficient means to rapidly move and reposition such semi-trailers for subsequent operations. These vehicles typically have a small single person cab and operate using a low-power diesel or alternative fuel engine.

Advantageously, such vehicles typically include a fifth wheel coupling for coupling to a kingpin of a semi-trailer. The fifth wheel coupling typically includes an integrated lifting mechanism. This lifting mechanism allows the semi-trailer's landing gear to remain in their lowered position during movement. Put differently, the fifth wheel coupling can be lifted upwards to connect to the kingpin and to lift the semi-trailer to such an extent that it no longer rests upon its landing gear. This creates a ground clearance that allows the terminal tractor to then tow the semi-trailer to a desired location.

Such terminal tractors, while a useful expedient for moving semi-trailers as described above, are not without some drawbacks. Indeed, the fifth wheel coupling of such terminal tractors includes an open ended slot into which the kingpin of the semi-trailer is received. This open ended slot defines a coupling point where the kingpin couples to the fifth wheel coupling. Because the kingpin is in a fixed location, and because the orientation of the open ended slot is fixed relative to the terminal tractor, the operator must carefully guide the terminal tractor to align the open ended slot with the kingpin, and then slowly back up to situate the kingpin within the slot until the kingpin reaches the coupling point.

The above mentioned alignment procedure unfortunately necessitates an appreciable amount of clearance in front of the semi-trailer to allow the operator room to position the terminal tractor and then connect to the semi-trailer. Because it is preferable to utilize as much space for storage of semi-trailers, devoting empty space for terminal tractor clearance is undesirable.

Further, due to the typical front wheel steering of such terminal tractors, they have relatively large turn radiuses which affect their overall maneuverability. Additionally, the above mentioned lifting mechanisms involve multiple linkages to the fifth wheel coupling. This relative complexity results in the fifth wheel coupling being situated off of the center point between the four wheels of the terminal tractor. This off centering only increases the clearance needed for the terminal tractor because the coupling point of the fifth wheel coupling defines the pivot point about which the terminal tractor rotates when connected to the semi-trailer.

Accordingly, there is a need in the art for a terminal tractor which addresses the above drawbacks to provide a vehicle with an enhanced turning radius and other enhanced operational characteristics. The invention provides such a terminal tractor. These and other advantages of the invention, as well as additional inventive features, will be apparent from the description of the invention provided herein.

BRIEF SUMMARY OF THE INVENTION

In one aspect, the invention provides a terminal tractor having a movable fifth wheel coupling which advantageously allows for an increased degree of maneuverability. An embodiment of such a terminal tractor includes a chassis with a plurality of wheels mounted in relation to the chassis such that the terminal tractor is in contact via the plurality of wheels with a ground surface. The plurality of wheels define a perimeter of an interior region of the terminal tractor. This embodiment also includes fifth wheel coupling situated within the interior region and configured for coupling to a kingpin of a semi-trailer. The fifth wheel coupling defines a first axis that is arranged perpendicular to a first longitudinal plane of the terminal tractor. The fifth wheel coupling is rotatable about the first axis in a second longitudinal plane parallel to the first longitudinal plane.

In an embodiment according to this aspect, fifth wheel coupling may include a lifting mechanism, said lifting mechanism configured to transition a coupling body of the fifth wheel coupling from a lowered position to a raised position and from the raised position to the lowered position by moving the coupling body in a single vertical direction.

In an embodiment according to this aspect, the terminal tractor includes a rotation mechanism for rotating the fifth wheel coupling about the first axis. The rotation mechanism may include an electric motor.

In an embodiment according to this aspect, the electric motor is one of directly or indirectly coupled to a coupling body of the fifth wheel coupling. The terminal tractor may also include a power source carried by the chassis, said power source providing power to said electric motor. The terminal tractor may also include a controller for controlling the operation of the rotation mechanism to control the rotation of the fifth wheel coupling about the first axis. The power source may be an electric power source.

In an embodiment according to this aspect, the controller is operable to send an output signal to said rotation mechanism based on an input signal from a detection system of the terminal tractor.

In another aspect, the invention provides a terminal tractor with a rotatable fifth wheel coupling. An embodiment of such a terminal tractor includes a chassis having a front end and a rear end, with a plurality of wheels mounted in relation to the chassis such that the terminal tractor is in contact via the plurality of wheels with a ground surface. This embodiment also includes a fifth wheel coupling mounted to the chassis. The fifth wheel coupling includes a coupling body having an open ended slot. The open ended slot configured to receive a kingpin of a semi-trailer. The fifth wheel coupling is rotatable relative to the chassis such that an opening of the open ended slot may be reoriented relative to the rear end of the chassis.

In an embodiment according to this aspect, the terminal tractor also includes a rotation mechanism for reorienting the opening of the open ended slot relative to the rear end of the chassis. The rotation mechanism may include an electric motor. The electric motor may be one of directly or indirectly coupled to the coupling body of the fifth wheel coupling.

In an embodiment according to this aspect, the terminal tractor also includes a power source carried by the chassis, said power source providing power to said electric motor.

In an embodiment according to this aspect, the invention also includes a controller for controlling the operation of the rotation mechanism. The controller is operable to send an output signal to the rotation mechanism based on an input signal from a detection system of the terminal tractor.

In yet another aspect, the invention provides a terminal tractor which requires a reduced amount of ground clearance to connect to a semi-trailer. An embodiment of a tractor trailer according to this aspect includes a chassis defining a longitudinal axis with a plurality of wheels mounted in relation to the chassis such that the terminal tractor is in contact via the plurality of wheels with a ground surface. This embodiment also includes a fifth wheel coupling mounted to the chassis that defines a linear connection direction for connection to a kingpin of a semi-trailer. The chassis is rotatable relative to the fifth wheel coupling to arrange the longitudinal axis of the chassis in a non-parallel orientation relative to the connection direction.

In an embodiment according to this aspect, the fifth wheel coupling includes a coupling body having an open ended slot that is configured to receive a kingpin of a semi-trailer. The open end slot also defines the connection direction. The fifth wheel coupling is rotatable relative to the chassis such that an opening of the open ended slot may be reoriented relative to a rear end of the chassis.

In an embodiment according to this aspect, the fifth wheel coupling defines a first axis arranged perpendicular to a first longitudinal plane of the terminal tractor. The fifth wheel coupling is rotatable about the first axis in a second longitudinal plane parallel to the first longitudinal plane.

In an embodiment according to this aspect, the terminal tractor also includes a rotation mechanism for rotating the fifth wheel coupling about the first axis to reorient the opening of the open ended slot.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 8-9 are top views of the terminal tractor of FIG. 1 connecting to a semi-trailer.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
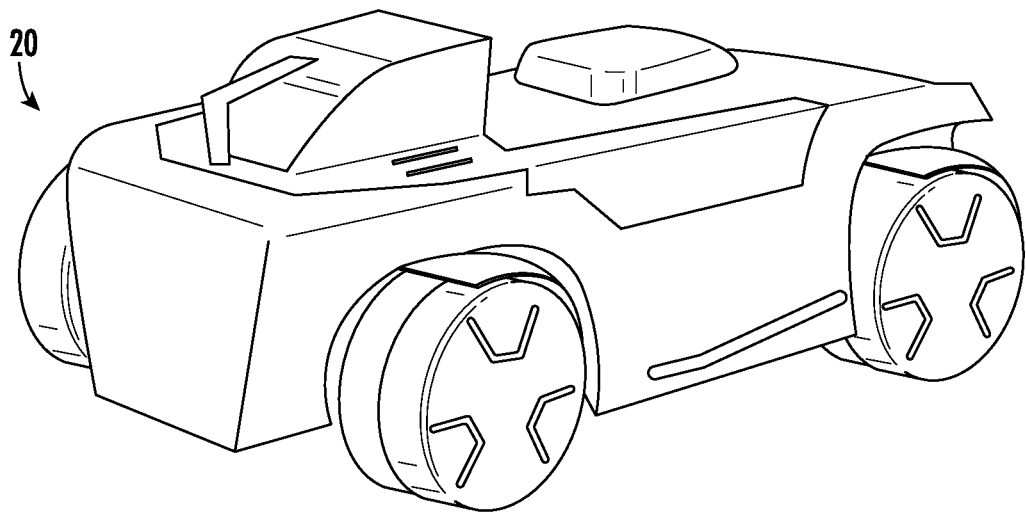
FIG. 1 is a perspective view of an exemplary embodiment of a terminal tractor according to the teachings herein.

Turning now to the drawings, FIG. 1 illustrates an automated terminal tractor 20 which advantageously provides a highly mobile and modular platform that presents enhanced turning and fifth wheel functionality. While shown with various cosmetic coverings and features, such coverings and features are entirely optional. As may be surmised from inspection of FIG. 1, terminal tractor 20 is a wheeled vehicle. As will be explained in greater detail below, terminal tractor 20 utilizes a fifth wheel coupling which is fully rotatable relative to terminal tractor 20. These features, among others, provide distinct advantageous over prior designs which fixed fifth wheel couplings, i.e. fifth wheel couplings that have an opening which always faces the rear of the vehicle.

Figure 2:
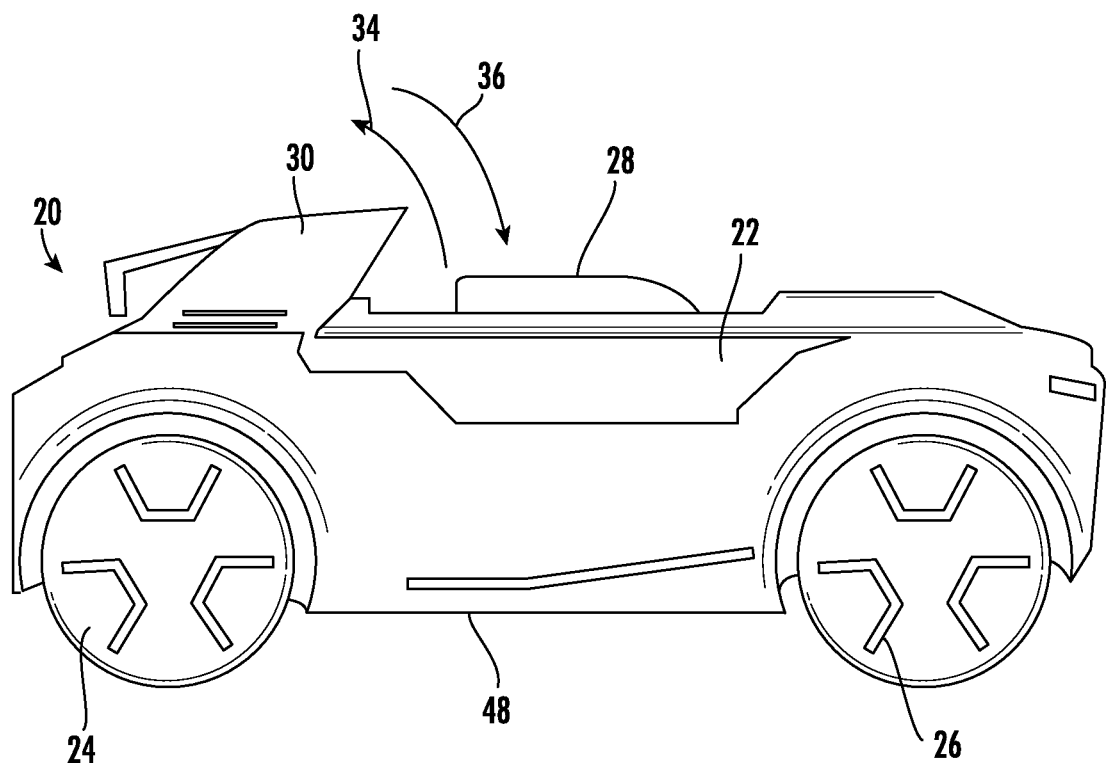
FIG. 2 is a side view of the terminal tractor of FIG. 1.

With particular reference to FIG. 2, terminal tractor 20 includes a chassis 22, a plurality of wheels in the form of a first pair of wheels 24, and a second pair of wheels 26 as shown. As will explained below, a drive motor is associated with each one of the wheels 24, 26 to independently provide a drive input to the same. A fifth wheel coupling 28 is also mounted to chassis 22 and is used to connect to a kingpin of semi-trailer.

Terminal tractor 20 may also include a control head 30 which provides connection points to at least one of an air brake line or an electrical connection of a semi-trailer connected to terminal tractor 20. Control head 30 may be foldable in direction 34 from its stowed position shown in FIG. 2 to an upright position such that it has a generally vertical presentation. Control head 30 may also be moved in direction 36 from the upright position to its stowed position. This folding functionality may be achieved by any known mechanical expedient such as motors and optionally associated linkages.

Control head 30 may also include communication devices such as antenna, transmitters, and receiving for communicating with any other devices. For non-limiting example, control head 30 may contain the componentry necessary for receiving GPS signals, as well as the componentry necessary for communicating with a network, e.g. a cellular or local area network using any known means of communication over such a network. Control head 30 may also package some or all of the sensor devices needed for the autonomous or remote operation of terminal tractor 20, such as vision systems, anti-collision systems, sonar devices, etc. Still further, control head 30 may include solar power panels for charging an onboard power source 48. It is also contemplated that all of the componentry of control head 30 may be housed elsewhere in terminal tractor 20 in those embodiments which do not include a control head.

A power source 48 may also be connected to chassis 22. This power source may for example be an electric power source using batteries, nitrogen, hydrogen, fuel cells, or any combination thereof. Power source 48 is modular in that it may be readily removed and replaced from terminal tractor 20 in much the same way a battery is removable and readily replaceable from a device. To that end, power source 48 may include one or more sub-modules which mount to chassis at different locations 22. Further power source 48 may include provisions for connecting to a charging station to recharge it.

It is also contemplated that terminal tractor 20 may draw power via induction using an electric road or rail configuration.

Figure 3:
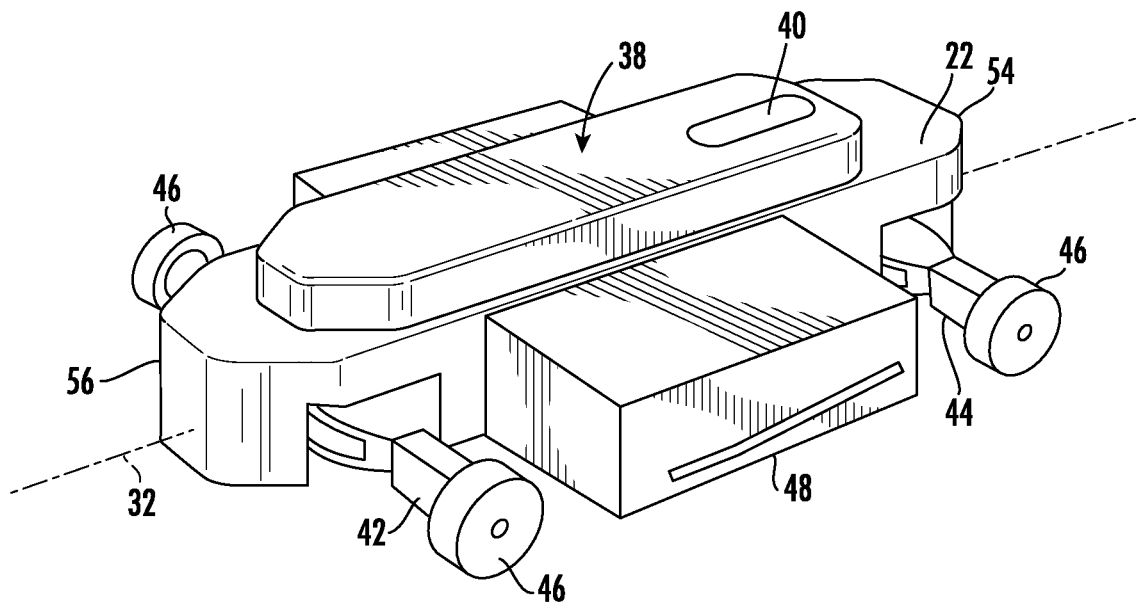
FIGS. 3 and 4 are perspective views of a chassis and associated componentry of the terminal tractor of FIG. 1.

Turning now to FIG. 3, the same shows terminal tractor 20 with its wheels 24, 26 and cosmetic coverings removed. Chassis 22 defines a longitudinal axis 32 and functions as a central frame and may be made of a high strength steel or other allow to present a light yet rigid frame. Chassis 22 may include an internal cavity or region 38.

A controller 40 may be housed in this internal cavity 38. "Controller" as used herein is meant to include all of the firmware, software, and hardware needed to control and operate the terminal tractor 20, including but not limited to its autonomous or remote operability. Controller 40 is designed to communicate with all the sensors of terminal tractor 20 necessary to effectuate its autonomous operation as inputs, and send control signals as outputs.

Controller 40 also incorporates all of the means necessary for communicating with users as well as other machines. As such, controller 40 may include artificial intelligence programming to achieve such ends. As a non-limiting example, controller 40 may include programming allowing it to receive a job or command list, such as a list of pickup and subsequent drop off locations for semi-trailers. Controller 40 is operable to autonomously control terminal tractor 20 to execute the details of such a command list. In operating as such, controller 40 is operable to interpret the information it receives from the various sensory systems of terminal tractor 20. Controller 40 is designed to be modular in that it may be readily removed from chassis 22 for updates and maintenance.

A first axle 42 for carrying the first pair of wheels 24 (see FIG. 2) is mounted to chassis 22. "Wheel" or "wheels" as used herein includes a single wheel, or a multiple wheel configuration. For example, the first pair of wheels 24 is mounted to first axle 42 such that one wheel 24 is at one end of first axle 42, while the other wheel 24 is at the other end of first axle 42. Each wheel at each end may encompass a single wheel, or a multiple wheel (e.g. a dual wheel) configuration.

In an identical fashion, a second axle 44 is mounted to chassis 22 and is used to carry the second pair of wheels 26. Axles 42, 44 may be embodied for example as pendulum axles to ensure that a terminal tractor 20 maintains good ground contact using all four wheels 24, 26, despite uneven terrain.

As may be seen in FIG. 3, a plurality of drive motors 46 are also provided. A drive motor 46 is respectively associated with each wheel 24, 26 as shown. The drive motors draw power from power source 48 and are controlled by controller 40 to ultimately rotate their respective wheel 24, 26 about its respective axle 42, 44. Drive motors 46 may be embodied by any rotary electric drive motor. Additionally, one or more radiators or other similar cooling devices 54, 56 may be provided on chassis 22 to provide cooling to terminal tractor 20.

Figure 4:
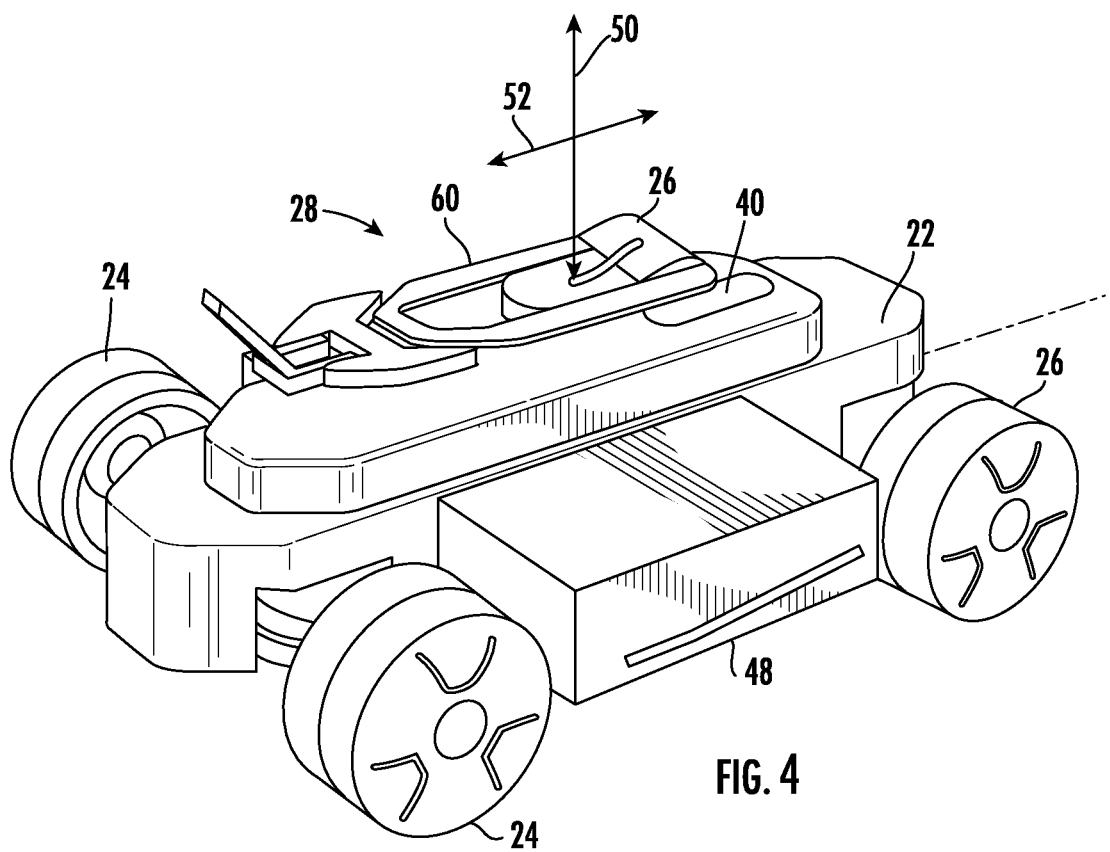

Turning now to FIG. 4, as mentioned above, terminal tractor 20 includes a fifth wheel coupling 28 for connecting to a kingpin of a semi-trailer. Fifth wheel coupling includes a lifting mechanism described below, as well as a coupling body 60 which mates with the aforementioned kingpin. Coupling body 60 may also provide a mounting location for the above discussed control head 30. Alternatively, control head 30 may mount to chassis 22.

Lifting mechanism is operable to raise and lower coupling body in a single vertical direction generally denoted by axis 50 shown in FIG. 4. By "single vertical direction" it is meant that the coupling body 60, and more particularly a coupling point 62 (see FIG. 5) moves linearly up and down with a single component directional vector. This is a departure from prior designs which typically move their coupling body in a directional vector having multiple directional components.

Indeed, many existing designs move the coupling body along an arcuate path. Such motion requires a more complex mechanism, and results in the coupling point of the coupling body being offset from the center defined between the wheels of such existing terminal tractors. Due to this offset, such existing terminal tractors inherently have a larger turning radius when connected to a semi-trailer. In other words, more front end clearance is needed for the terminal tractor to turn as it pulls the semi-trailer.

In the illustrated embodiment, the lifting mechanism may achieve such purely vertical motion along axis 50 by way of a linear actuator acting directly underneath coupling body 60 to move the same vertically up and down. Additionally, an additional mechanism may be employed to shift coupling body 60 along axis 52. Still further, coupling body 60 may be rotatable about axis 50 to reposition the opening of coupling body for receiving the kingpin, and also rotatable about an axis normal to the plane of axes 50, 52 to allow coupling body 60 to tilt.

Still referring to FIG. 4, wheels 24, 26 may incorporate any type of tire, the selection of which will depend largely upon operational environment. As one non-limiting example, these tires may be non-air tires which provide enhanced durability and traction and are lower in maintenance requirements than their air filled counterparts. A cone design may also be employed which improves four wheel steering capabilities and allows for excellent turning angles.

Figure 5:
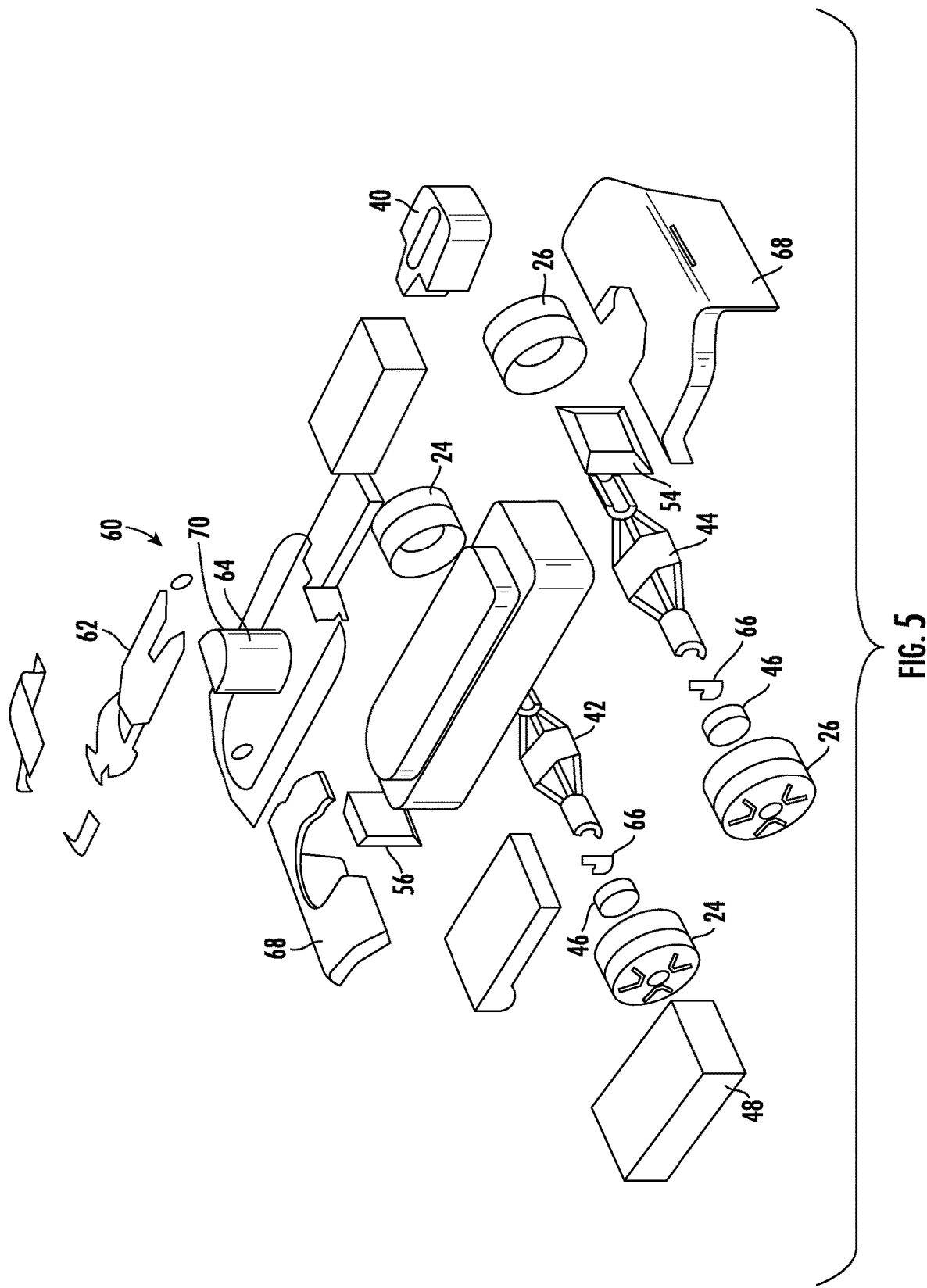
FIG. 5 is an exploded view of the terminal tractor of FIG. 1.

Turning now to the exploded view illustrated in FIG. 5, lifting mechanism 64 is generally illustrated as a linear cylinder lifting mechanism, e.g. a linear actuator. This may be an electric, hydraulic, or pneumatic actuator. In the case of hydraulics or pneumatics, terminal tractor 20 will also include a hydraulic or pneumatic system. As mentioned above, this lifting mechanism 64 acts directly on coupling body 60 to linearly move coupling point 62 in a single vertical direction.

Terminal tractor 20 also includes a plurality of steering devices 66, two of which are shown exploded relative to their associated wheels 24, 26 and associated axles 42, 44. Indeed, each wheel 24, 26, includes its own local steering device 66 in the same manner as each wheel includes its own drive motor 46. These steering devices may for example be servo motors operable to turn its respectively associated wheel 24, 26 relative to that wheel's 24, 26 associated axle. The steering devices 66 receive steering input commands from controller 40 and are independently movable relative to one another. As such, it is possible for each wheel 24, 26 to have a different orientation thus opening a variety of steering capabilities.

Still referring to FIG. 5, terminal tractor 20 also includes a rotation mechanism 70 which may be directly or indirectly coupled to coupling body 62 to rotate the same about axis 50 (see FIG. 4). This rotation mechanism 70 may for example be an electric motor such as a servo motor. Rotation mechanism may also be embodied by any other mechanical expedient sufficient to cause a rotation about an axis. Rotation mechanism may receive power from power source 48, and be controlled by controller 40. To that end, additional sensors may be employed to detect the rotational position of rotation mechanism 70 (and hence coupling body 62) relative to the remainder of terminal tractor 20. Any sensor sufficient to detect the rotational position of an object may be utilized to achieve this end.

Rotation mechanism 70 may be packaged with lifting mechanism 60 as illustrated or it may be a separate component. In either case, rotation mechanism 70 is connect directly to coupling body 62 or indirectly through any intermediate structure, e.g. linkages, gearing, etc., to rotate the same about axis 50. This allows terminal tractor 20 to reorient fifth wheel coupling relative to terminal tractor 20 so that terminal tractor 20 need not reposition itself entirely to engage a kingpin.

Figure 6:
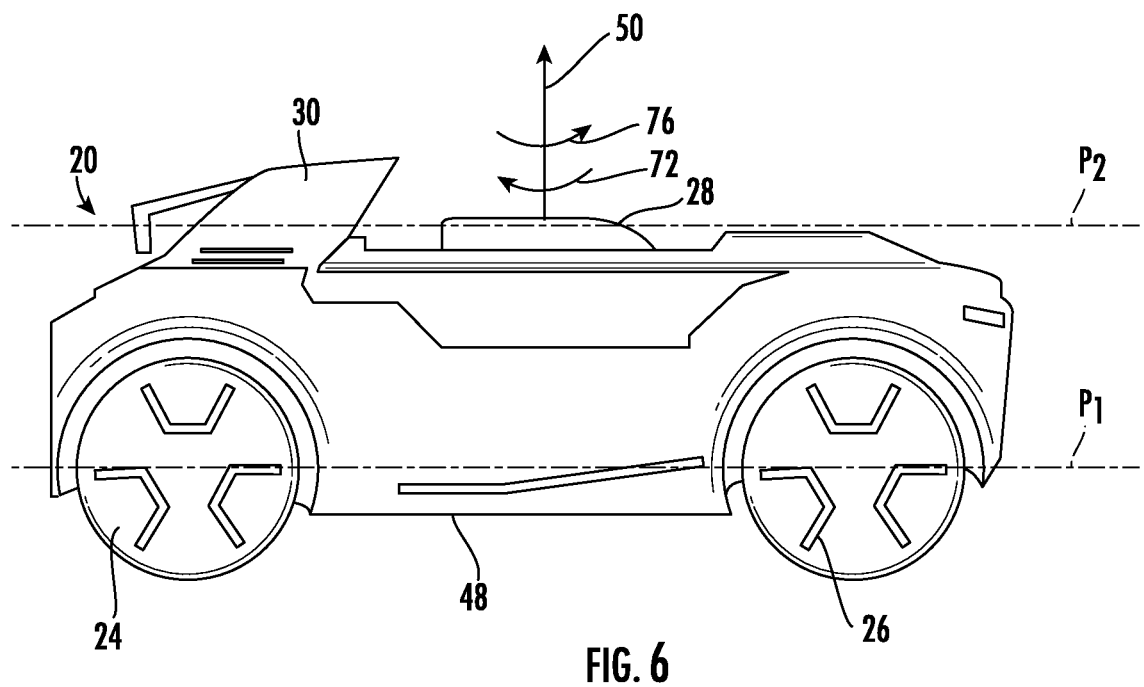
FIG. 6 is another side view of the terminal tractor of FIG. 1.

Turning now to FIG. 6, axis 50 extends normal to plane $P_1$. Plane $P_1$ extends into the viewing plane in FIG. 6, and may be considered to be a longitudinal plane within which the centers of wheels 24, 26 reside. Fifth wheel coupling 28 is rotatable about axis 50 in directions 72, 76 in a second longitudinal plane $P_2$ which extends through coupling body 62 (see FIG. 5) and is parallel to plane $P_1$.

Figure 7:
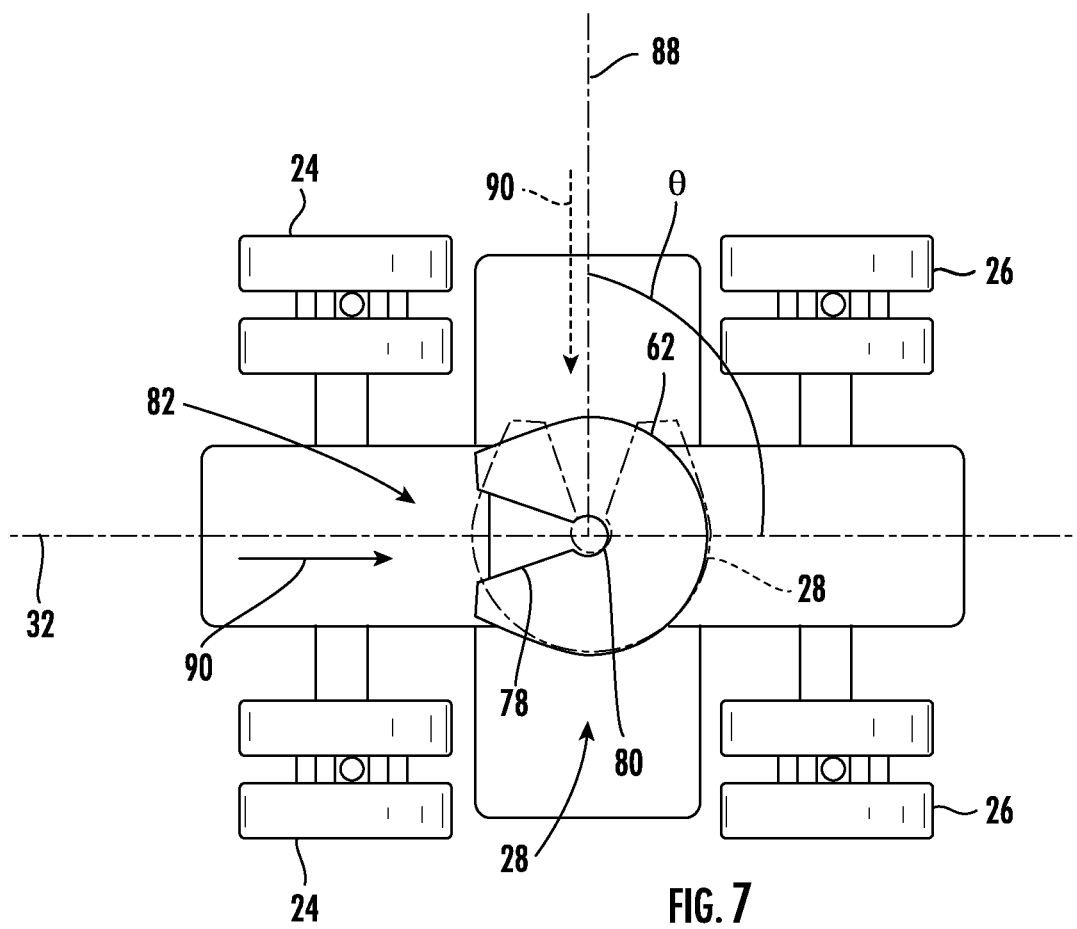
FIG. 7 is a top view schematic illustration of the terminal tractor of FIG. 1.

FIG. 7 elaborates upon the aforementioned rotational functionality of fifth wheel coupling 28 in greater detail. FIG. 7 presents a simplified schematic illustration of terminal tractor 20. As can be seen in this view, coupling body 62 includes an open ended slot 78 that also defines a coupling point 80. A kingpin coupled to fifth wheel coupling 28 at coupling point 80. Open ended slot 78 includes an opening 82 so that a kingpin may enter coupling body 62 and seat at coupling point 80. This opening thus faces and defines a connection direction 90 in which a kingpin must move in order to seat at coupling point 80.

Rotation mechanism 70 (see FIG. 5) is operable to rotate coupling body 62 at any arbitrary angle θ so that connection direction 90 (see also reference axis 88) is reoriented relative to longitudinal axis 32 of chassis 22. Although described in the context of terminal tractor 20 which employs four wheel steering and autonomous capabilities, the invention herein of an independently rotatable fifth wheel coupling is not limited to such a particularized vehicle. Indeed, it is contemplated by the teachings herein that the invention of an independently rotatable fifth wheel coupling may be integrated into any vehicle design which employs a fifth wheel coupling.

Turning now to FIG. 8, the above functionality provides a distinct advantage over prior designs in that it greatly reduces the envelope of space needed for terminal tractor 20 to position itself relative to a semi-trailer. For example, in FIG. 8, terminal tractor 20 has just positioned semi-trailer 120 as shown, and has now begun to travel in direction 96 toward trailer 121. In prior designs having fixed fifth wheel coupling, such designs would need to perform a three point turn in order to back up to and connect to trailer 121. This is not the case with terminal tractor 20.

Indeed, fifth wheel coupling 28 may simply rotate independently relative to terminal tractor 20 in direction 76. Turning now to FIG. 9, terminal tractor 20 may then simply approach semi-trailer 121 by continuing to proceed along path 96 shown in FIG. 8 to ultimately connection to this semi-trailer. A complicated turn-around maneuver is not required, due to the independently rotatable fifth wheel coupling as shown. As a result, less clearance space is required for terminal tractor 20 to operate.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A terminal tractor, comprising:
   a chassis;
   a plurality of wheels mounted in relation to the chassis such that the terminal tractor is in contact via the plurality of wheels with a ground surface, the plurality of wheels defining a perimeter of an interior region of the terminal tractor;
   a fifth wheel coupling situated within the interior region and configured for coupling to a kingpin of a semi-trailer;
   wherein the fifth wheel coupling defines a first axis arranged perpendicular to a first longitudinal plane of the terminal tractor;
   wherein the fifth wheel coupling is rotatable about the first axis in a second longitudinal plane parallel to the first longitudinal plane;
   a rotation mechanism for rotating the fifth wheel coupling about the first axis;
   a controller controlling the operation of the rotation mechanism to control the rotation of the fifth wheel coupling about the first axis; and
   wherein said controller sends an output signal to said rotation mechanism based on an input signal from a detection system of the terminal tractor.

2. The terminal tractor of claim 1, wherein the fifth wheel coupling includes a lifting mechanism, said lifting mechanism configured to transition a coupling body of the fifth wheel coupling from a lowered position to a raised position and from the raised position to the lowered position by moving the coupling body in a single vertical direction.

3. The terminal tractor of claim 1, wherein the rotation mechanism comprises an electric motor.

4. The terminal tractor of claim 3, wherein the electric motor is one of directly or indirectly coupled to a coupling body of the fifth wheel coupling.

5. The terminal tractor of claim 3, further comprising a power source carried by the chassis, said power source providing power to said electric motor.

6. The terminal tractor of claim 5, wherein the power source is an electric power source.

7. A terminal tractor, comprising:
a chassis having a front end and a rear end;
a plurality of wheels mounted in relation to the chassis such that the terminal tractor is in contact via the plurality of wheels with a ground surface;
a fifth wheel coupling mounted to the chassis;
wherein the fifth wheel coupling includes a coupling body having an open ended slot, said open ended slot configured to receive a kingpin of a semi-trailer;
wherein the fifth wheel coupling is rotatable relative to the chassis such that an opening of the open ended slot may be reoriented relative to the rear end of the chassis;
a rotation mechanism for reorienting the opening of the open ended slot relative to the rear end of the chassis;
a controller controlling the operation of the rotation mechanism, said controller sends an output signal to said rotation mechanism based on an input signal from a detection system of the terminal tractor.

8. The terminal tractor of claim 7, wherein the rotation mechanism comprises an electric motor.

9. The terminal tractor of claim 8, wherein the electric motor is one of directly or indirectly coupled to the coupling body of the fifth wheel coupling.

10. The terminal tractor of claim 9, further comprising a power source carried by the chassis, said power source providing power to said electric motor.

11. A terminal tractor, comprising:
a chassis defining a longitudinal axis;
a plurality of wheels mounted in relation to the chassis such that the terminal tractor is in contact via the plurality of wheels with a ground surface;
a fifth wheel coupling mounted to the chassis and defining a linear connection direction for connection to a kingpin of a semi-trailer; and
wherein the chassis is rotatable relative to the fifth wheel coupling about a first axis to arrange the longitudinal axis of the chassis in a non-parallel orientation relative to the connection direction;
a rotation mechanism for rotating the fifth wheel coupling about the first axis, the first axis being non-parallel to the linear connection direction and the longitudinal axis of the chassis such that rotation about the first axis reorients the linear connection direction relative to the longitudinal axis; and
a controller controlling the operation of the rotation mechanism to control the rotation of the fifth wheel coupling about the first axis, said controller sends an output signal to said rotation mechanism based on an input signal from a detection system of the terminal tractor.

12. The terminal tractor of claim 11, wherein the fifth wheel coupling includes a coupling body having an open ended slot, said open ended slot configured to receive a kingpin of a semi-trailer and defining the connection direction, wherein the fifth wheel coupling is rotatable relative to the chassis about the first axis such that an opening of the open ended slot may be reoriented relative to a rear end of the chassis.

13. The terminal tractor of claim 12, wherein the first axis is arranged perpendicular to a first longitudinal plane of the terminal tractor, and wherein the fifth wheel coupling is rotatable about the first axis in a second longitudinal plane parallel to the first longitudinal plane.

* * * * *